United States Patent
Yao et al.

(10) Patent No.: US 10,814,955 B2
(45) Date of Patent: Oct. 27, 2020

(54) AIRCRAFT HAVING AN AFT ENGINE

(71) Applicant: General Electric Company, Schenectady, NY (US)

(72) Inventors: Jixian Yao, Niskayuna, NY (US); Nikolai N. Pastouchenko, Glenville, NY (US); Patrick John Lonneman, Independence, KY (US); Patrick Michael Marrinan, Mason, OH (US); Richard David Cedar, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 361 days.

(21) Appl. No.: 15/890,785

(22) Filed: Feb. 7, 2018

(65) Prior Publication Data
US 2019/0241248 A1 Aug. 8, 2019

(51) Int. Cl.
*B64C 1/16* (2006.01)
*B64D 27/24* (2006.01)
(Continued)

(52) U.S. Cl.
CPC .................. *B64C 1/16* (2013.01); *B64C 5/04* (2013.01); *B64C 23/00* (2013.01); *B64D 27/14* (2013.01);
(Continued)

(58) Field of Classification Search
CPC .. B64C 1/16; B64C 5/04; B64C 23/00; B64C 2230/04
See application file for complete search history.

(56) References Cited

U.S. PATENT DOCUMENTS 3,355,883 A 12/1967 Beam, Jr.
4,474,344 A 10/1984 Bennett
(Continued)

FOREIGN PATENT DOCUMENTS

| EP | 0887259 A2 | 12/1998 |
|---|---|---|
| EP | 3144218 A1 | 3/2017 |
| GB | 1041132 A | 9/1966 |

OTHER PUBLICATIONS

Carrier et al., "Numerical and Experimental Aerodynamic Investigations of Boundary Layer Ingestion for Improving Propulsion Efficiency of Future Air Transport", Applied Aerodynamics Conference, https://www.researchgate.net/publication/256842087_Numerical_and_Experimental_Aerodynamic_Investigations_of_Boundary_Layer_Ingestion_for_Improving_Propulsion_Efficiency_of_Future_Air_Transport_Jun. 2013.
(Continued)

*Primary Examiner* — Rodney A Bonnette
(74) *Attorney, Agent, or Firm* — Dority & Manning, P.A.

(57) ABSTRACT

An aircraft includes a boundary layer ingestion fan defining a centerline and including a plurality of fan blades rotatable about the centerline. The aircraft also includes a fuselage extending between a forward end and an aft end along a longitudinal direction, the boundary layer ingestion fan positioned within the fuselage at the aft end of the fuselage, the fuselage defining an inlet upstream of the boundary layer ingestion fan extending at least about 180 degrees around the centerline of the boundary layer ingestion fan, the fuselage further defining an exhaust downstream of the boundary layer ingestion fan.

20 Claims, 9 Drawing Sheets

(51) Int. Cl.
*B64C 5/04* (2006.01)
*B64D 27/20* (2006.01)
*B64C 23/00* (2006.01)
*B64D 27/14* (2006.01)

(52) U.S. Cl.
CPC ............. *B64D 27/20* (2013.01); *B64D 27/24* (2013.01); *B64C 2230/04* (2013.01)

(56) References Cited

U.S. PATENT DOCUMENTS

| | | | |
|---|---|---|---|
| 5,014,933 | A | 5/1991 | Harm et al. |
| 5,984,231 | A * | 11/1999 | Gerhardt ................ B64C 5/04 244/46 |
| 6,049,667 | A | 4/2000 | Bates |
| 6,082,670 | A | 7/2000 | Chapman |
| 6,764,043 | B2 | 7/2004 | Sankrithi et al. |
| 6,938,854 | B2 | 9/2005 | Nelson |
| 8,181,905 | B2 | 5/2012 | McDonough et al. |
| 8,729,751 | B2 | 5/2014 | Telakowski et al. |
| 2013/0062460 | A1 | 3/2013 | Kreshchishina et al. |
| 2015/0291285 | A1 | 10/2015 | Gallet |
| 2016/0214727 | A1 | 7/2016 | Hamel et al. |
| 2017/0081035 | A1 | 3/2017 | Becker et al. |
| 2017/0081037 | A1 | 3/2017 | Marrinan et al. |
| 2017/0101191 | A1 | 4/2017 | Becker et al. |
| 2017/0121031 | A1 | 5/2017 | Stieger et al. |
| 2017/0211474 | A1 | 7/2017 | Sennoun |
| 2017/0369152 | A1 | 12/2017 | Yao et al. |
| 2018/0170560 | A1 * | 6/2018 | Conti ................ B64D 27/14 |

OTHER PUBLICATIONS

Seitz et al., "Parametric design Studies for Propulsive Fuselage Aircraft Concepts", CEAS Aeronautical Journal, https://link.springer.com/article/10.1007/s13272-014-0130-3, vol. 06, Issue 01, pp. 69-82, Mar. 2015.

Woollett, et al., Effect of Variable Inlet Guide Vanes on the Operating Characteristics of a Tilt Nacelle Inlet/Powered Fan Model, NASA Technical Memorandum 88983, Sep 1987, 41 pages. https://ntrs.nasa.gov/archive/nasa/casi.ntrs.nasa.gov/19870018195.pdf.

European Search Report Corresponding to Application No. 19155374 dated Apr. 29, 2019.

* cited by examiner

AIRCRAFT HAVING AN AFT ENGINE

FIELD

The present subject matter relates generally to an aircraft having an aft engine, or more particularly to an aircraft including an aft engine positioned within the fuselage.

BACKGROUND

A conventional commercial aircraft generally includes a fuselage, a pair of wings, and a propulsion system that provides thrust. The propulsion system typically includes at least two aircraft engines, such as turbofan jet engines. Each turbofan jet engine is typically mounted to a respective one of the wings of the aircraft, such as in a suspended position beneath the wing, separated from the wing and fuselage. Such a configuration allows for the turbofan jet engines to interact with separate, freestream airflows that are not impacted by the wings and/or fuselage. This configuration can reduce an amount of turbulence within the air entering an inlet of each respective turbofan jet engine, which has a positive effect on a net propulsive thrust of the aircraft.

However, a drag on the aircraft including the turbofan jet engines also affects the net propulsive thrust of the aircraft. A total amount of drag on the aircraft, including skin friction and form drag, is generally proportional to a difference between a freestream velocity of air approaching the aircraft and an average velocity of a wake downstream from the aircraft that is produced due to the drag on the aircraft.

Positioning a fan at an aft end of the fuselage of the aircraft may assist with reenergizing a boundary layer airflow over the aft end of the fuselage and improving propulsive efficiency. However, inclusion of the fan at the aft end of the fuselage of the aircraft may negatively affect the aircraft's ability to take-off or land, by interfering with an available takeoff angle of the aircraft. Accordingly, an aircraft capable of energizing slow-moving air forming a boundary layer across the fuselage of the aircraft without negatively affecting the aircraft's ability to take-off or land would be useful.

BRIEF DESCRIPTION

Aspects and advantages of the invention will be set forth in part in the following description, or may be obvious from the description, or may be learned through practice of the invention.

In one exemplary embodiment of the present disclosure, an aircraft defining a longitudinal direction and a vertical direction is provided. The aircraft includes a boundary layer ingestion fan defining a centerline and including a plurality of fan blades rotatable about the centerline. The aircraft also includes a fuselage extending between a forward end and an aft end along the longitudinal direction L, the boundary layer ingestion fan positioned within the fuselage at the aft end of the fuselage, the fuselage defining an inlet upstream of the boundary layer ingestion fan extending at least about 180 degrees around the centerline of the boundary layer ingestion fan, the fuselage further defining an exhaust downstream of the boundary layer ingestion fan.

In certain exemplary embodiments the aircraft defines a starboard side and a port side, and wherein the inlet includes a first portion on the starboard side and a second portion on the port side.

For example, in certain exemplary embodiments the first portion of the inlet extends substantially continuously for at least about 90 degrees around the centerline of the boundary layer ingestion fan, and wherein the second portion of the inlet also extends substantially continuously for at least about 90 degrees around the centerline of the boundary layer ingestion fan.

For example, in certain exemplary embodiments the boundary layer ingestion fan defines a circumferential direction extending about the centerline, and wherein the first portion of the inlet defines a nonuniform shape along the circumferential direction, and wherein the second portion of the inlet also defines a nonuniform shape along the circumferential direction.

For example, in certain exemplary embodiments the first portion of the inlet defines an upper half along the vertical direction and a lower half along the vertical direction, wherein the lower half of the first portion of the inlet defines a lower half inlet area, wherein the upper half of the first portion of the inlet defines a upper half inlet area, and wherein the lower half inlet area is greater than the upper half inlet area.

For example, in certain exemplary embodiments the aircraft defines a reference plane extending along the vertical direction and the centerline of the boundary layer ingestion fan, and wherein the first portion of the inlet and the second portion of the inlet are symmetrical about the reference plane.

In certain exemplary embodiments the fuselage defines a bottom side, wherein the inlet is defined at least partially at the bottom side of the fuselage, wherein the inlet extends substantially continuously across the bottom side of the fuselage for at least about 90 degrees around the centerline of the boundary layer ingestion fan.

For example, in certain exemplary embodiments the inlet extends substantially continuously across the bottom side of the fuselage for at least about 180 degrees around the centerline of the boundary layer ingestion fan.

For example, in certain exemplary embodiments the aircraft defines a reference plane extending along the vertical direction and the centerline of the boundary layer ingestion fan, wherein the inlet defines a starboard section and a port section, and wherein the starboard section and port section are symmetrical about the reference plane.

In certain exemplary embodiments the fuselage defines an airflow path extending between the inlet and the exhaust, wherein the plurality of fan blades of the boundary layer ingestion fan are positioned at least partially within the airflow path.

For example, in certain exemplary embodiments the airflow path defines a length along the longitudinal direction L, wherein the boundary layer ingestion fan defines a fan diameter, and wherein the length of the airflow path is greater than the fan diameter and up to about 15 times the fan diameter.

For example, in certain exemplary embodiments the length of the airflow duct is at least about 1.5 times the fan diameter.

In certain exemplary embodiments the fuselage defines a bottom side along the vertical direction, wherein a portion of the bottom side of the fuselage forward of the inlet defines a forward reference line, wherein a portion of the bottom side of the fuselage aft of the inlet defines an aft reference line, and wherein the aft reference line is substantially aligned with the forward reference line.

In certain exemplary embodiments the aircraft further includes a stabilizer coupled to, and extending from, fuselage, the stabilizer defining a forward-most point, and wherein the boundary layer ingestion fan is positioned within the fuselage at a location aft of the forward-most point of the stabilizer.

In certain exemplary embodiments the boundary layer ingestion fan is an electric fan.

In another exemplary embodiment of the present disclosure, an aircraft defining a longitudinal direction and a vertical direction is provided. The aircraft includes a boundary layer ingestion fan defining a centerline and including a plurality of fan blades rotatable about the centerline. The aircraft also includes a fuselage extending between a forward end and an aft end along the longitudinal direction, the boundary layer ingestion fan positioned within the fuselage at the aft end of the fuselage, the fuselage defining an inlet upstream of the boundary layer ingestion fan, an exhaust downstream of the boundary layer ingestion fan, and a bottom side along the vertical direction, wherein a portion of the bottom side of the fuselage forward of the inlet defines a forward reference line, wherein a portion of the bottom side of the fuselage aft of the inlet defines an aft reference line, and wherein the aft reference line is substantially aligned with the forward reference line.

In certain exemplary embodiments the inlet extends at least about 180 degrees around the centerline of the boundary layer ingestion fan.

For example, in certain exemplary embodiments the aircraft defines a starboard side and a port side, and wherein the inlet includes a first portion on the starboard side and a second portion on the port side.

For example, in certain exemplary embodiments the first portion of the inlet extends substantially continuously for at least about 90 degrees around the centerline of the boundary layer ingestion fan, and wherein the second portion of the inlet also extends substantially continuously for at least about 90 degrees around the centerline of the boundary layer ingestion fan.

In certain exemplary embodiments the inlet is defined at least partially at the bottom side of the fuselage, wherein the inlet extends substantially continuously across the bottom side of the fuselage for at least about 90 degrees around the centerline of the boundary layer ingestion fan.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Figure 1:
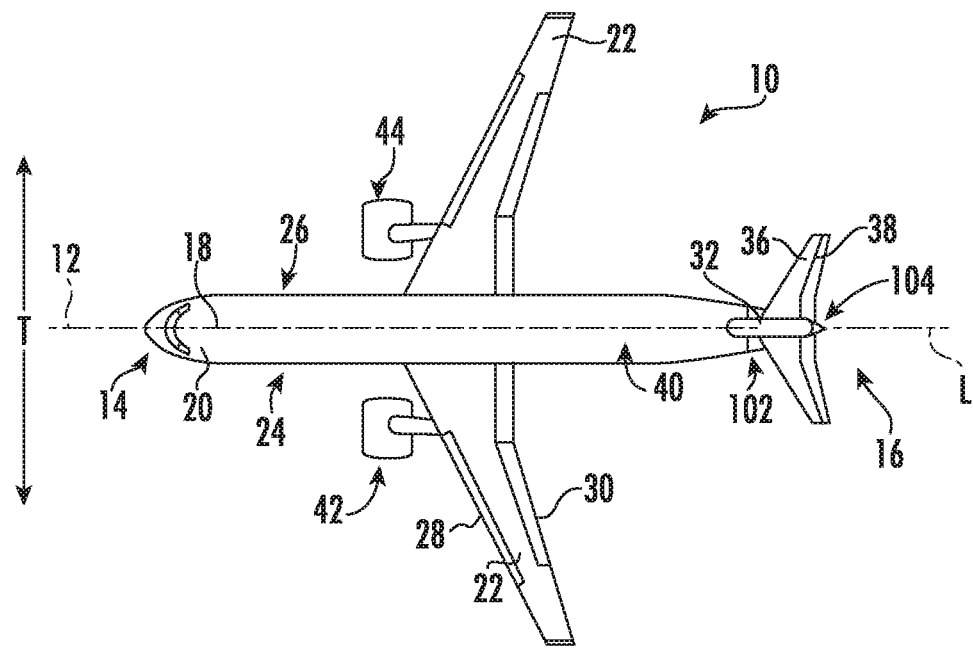
FIG. 1 is a top view of an aircraft according to various exemplary embodiments of the present disclosure.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

As used herein, the terms "first", "second", and "third" may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Figure 2:
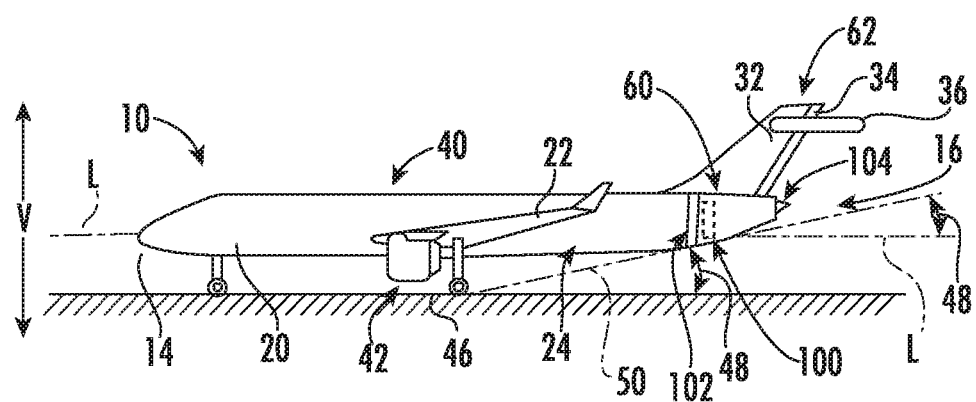
FIG. 2 is a port side view of the exemplary aircraft of FIG. 1.
Figure 3:
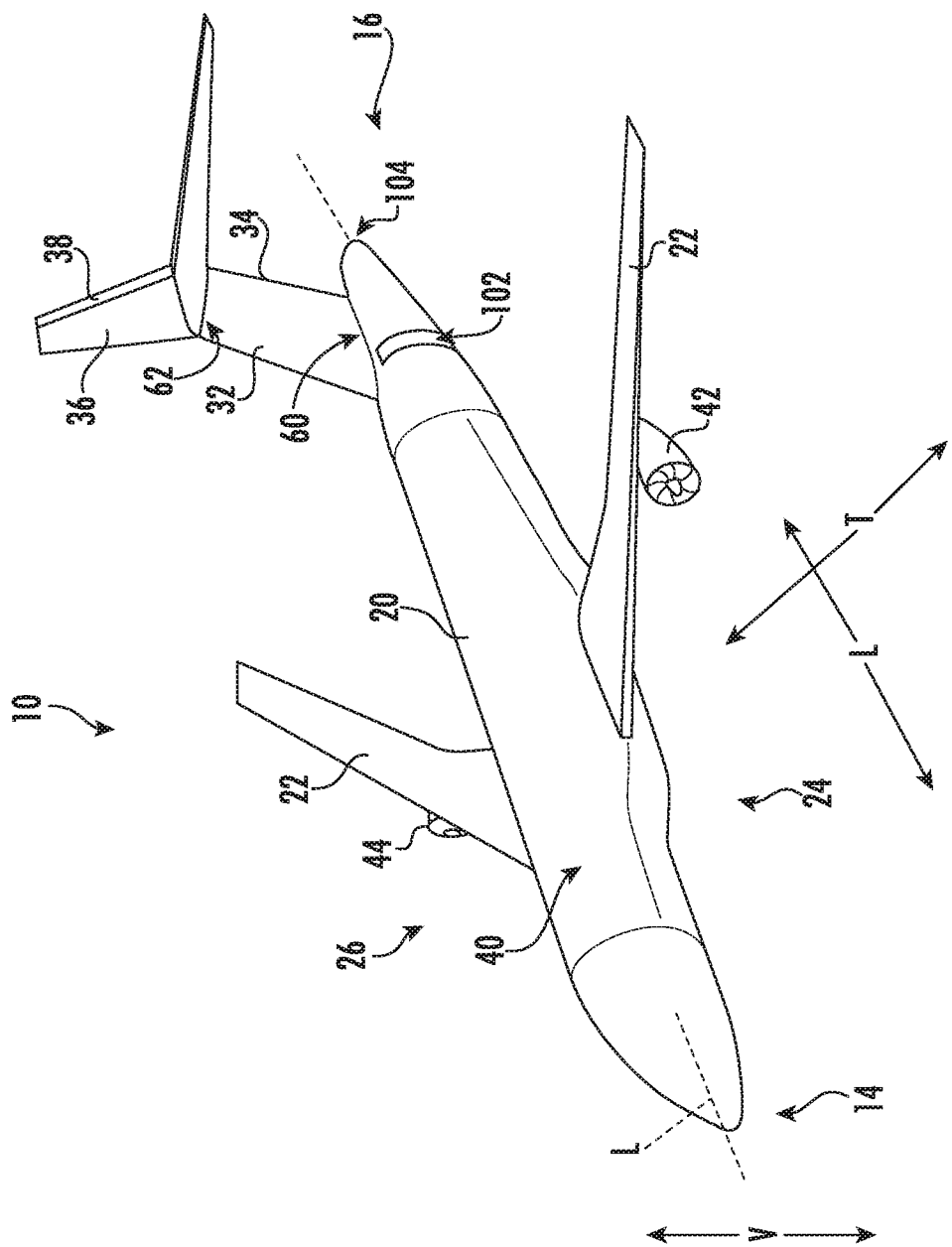
FIG. 3 is a perspective view of the exemplary aircraft of FIG. 1.

Referring now to the drawings, wherein identical numerals indicate the same elements throughout the figures, FIG. 1 provides a top view of an exemplary aircraft 10 as may incorporate various embodiments of the present invention. FIG. 2 provides a port side 24 view of the aircraft 10 as illustrated in FIG. 1. FIG. 3 provides a perspective view of the aircraft 10 as illustrated in FIG. 1. As shown in FIGS. 1 through 3 collectively, the aircraft 10 defines a longitudinal direction L that extends therethrough, a vertical direction V, a transverse direction T, a forward end 14, and an aft end 16.

Moreover, the aircraft 10 includes a fuselage 20, extending longitudinally from the forward end 14 of the aircraft 10 towards the aft end 16 of the aircraft 10, and a pair of wings 22. As used herein, the term "fuselage" generally includes all of the body of the aircraft 10, such as an empennage of the aircraft 10 and an outer surface or skin of the aircraft 10. The first of such wings 22 extends laterally outwardly with respect to the longitudinal direction L from a port side 24 of the fuselage 20 and the second of such wings 22 extends laterally outwardly with respect to the longitudinal direction L from a starboard side 26 of the fuselage 20. Each of the wings 22 for the exemplary embodiment depicted includes one or more leading edge flaps 28 and one or more trailing edge flaps 30. The aircraft 10 further includes a vertical stabilizer 32 having a rudder flap 34 for yaw control, and a pair of horizontal stabilizers 36, each having an elevator flap 38 for pitch control. The fuselage 20 additionally includes an outer surface 40.

As illustrated, the vertical stabilizer 32 defines a root portion 60 and a tip portion 62 separated along the vertical direction V. As further illustrated, the vertical stabilizer 32 is mounted to fuselage 20 at root portion 60 and extends substantially along the vertical direction V to tip portion 62. The horizontal stabilizers 36 are coupled to, and extend from the tip portion 62 of the vertical stabilizer 32. However, it should be appreciated that in other exemplary embodiments of the present disclosure, the aircraft 10 may additionally or alternatively include any other suitable configuration of stabilizers that may or may not extend directly along the vertical direction V or horizontal/transverse direction T. In addition, alternative stabilizers may be any suitable shape, size, configuration, or orientation while remaining within the scope of the present subject matter.

The exemplary aircraft 10 of FIGS. 1 through 3 also includes a propulsion system. The exemplary propulsion system includes a plurality of aircraft engines, at least one of which mounted to each of the pair of wings 22. Specifically, the plurality of aircraft engines includes a first aircraft engine 42 mounted to a first wing of the pair of wings 22 and a second aircraft engine 44 mounted to a second wing of the pair of wings 22. In at least certain exemplary embodiments, the aircraft engines 42, 44 may be configured as turbofan jet engines suspended beneath the wings 22 in an under-wing configuration. Alternatively, however, in other exemplary embodiments any other suitable aircraft engine may be provided. For example, in other exemplary embodiments the first and/or second aircraft engines 42, 44 may alternatively be configured as turbojet engines, turboshaft engines, turboprop engines, etc. Further, in other embodiments, the aircraft 10, or rather the propulsion system of the aircraft 10, may include any other suitable number or configuration (e.g., mounting location) of aircraft engines.

Additionally, the propulsion system includes a boundary layer ingestion fan 100 (depicted schematically in FIG. 2) positioned within the fuselage 20 of the aircraft 10 proximate the aft end 16 of the aircraft 10, as will be explained in more detail below. As will also be discussed in greater detail below, the fuselage 20 generally defines an inlet 102 upstream of the boundary layer ingestion fan 100 and an exhaust 104 downstream of the boundary layer ingestion fan 100. In such a manner, the boundary layer ingestion fan 100 may ingest boundary layer airflow 106 (see FIG. 4) over the aft end 16 of the aircraft 10 through the inlet 102 defined by the fuselage 20, re-energize such airflow 106, and provide such airflow 106 out through the exhaust 104 to increase a net propulsive benefit of the propulsion system of the aircraft 10.

Referring specifically to FIG. 2, the aircraft 10 additionally includes landing gear, such as wheels 46, extending from a bottom side of the fuselage 20 and from a bottom side of the wings 22. The fuselage 20 is designed to allow the aircraft 10 to takeoff and/or land at a takeoff angle 48 with the ground without the aft end 16 scraping the ground. More specifically, takeoff angle 48 may be defined as the angle between the ground (parallel to longitudinal direction L) and a takeoff plane 50. As will be discussed below, the exemplary fuselage 20 and boundary layer ingestion fan 100 described herein are designed to allow the aircraft 10 to maintain a desired takeoff angle 48, despite the inclusion of a boundary layer ingestion fan 100 at the aft end 16 of the aircraft 10. Notably, for the embodiment depicted, the longitudinal direction L of the aircraft 10 is parallel to the ground when the aircraft 10 is on the ground. Accordingly, the maximum takeoff angle 48, as shown, may also be defined with the longitudinal direction L of the aircraft 10.

Figure 4:
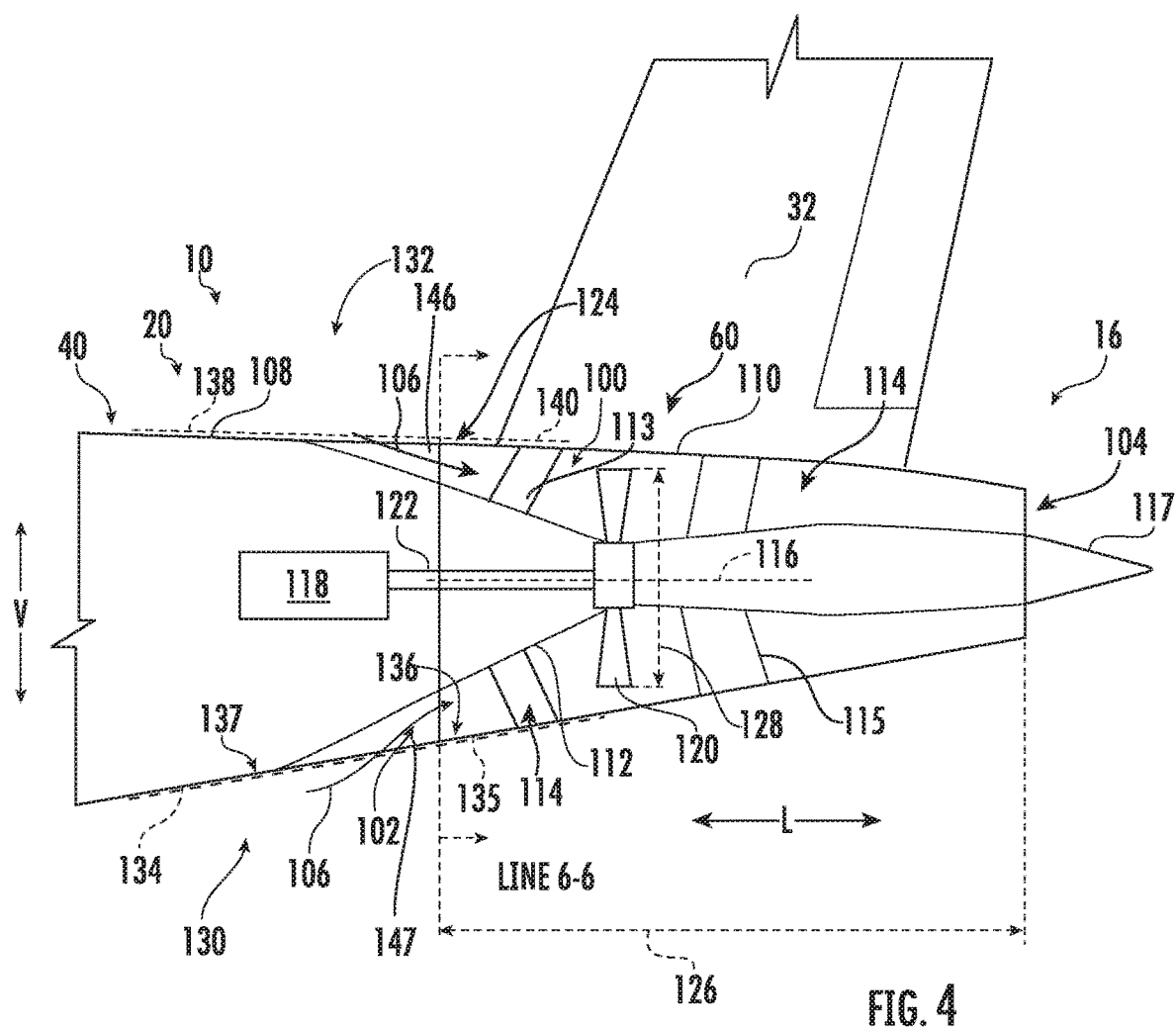
FIG. 4 is a close-up, cross-sectional view of an aft end of the exemplary aircraft of FIG. 1.

Referring now to FIG. 4, a close-up, cross-sectional view of the exemplary boundary layer ingestion fan 100 described above with reference to FIGS. 1 through 3 is provided. More specifically, FIG. 4 provides a close-up, cross-sectional view of the aft end 16 of the aircraft 10 depicted in FIG. 2.

As is depicted, the fuselage 20 generally includes a main section 108 located forward of the inlet 102 and an aft section 110 located aft of the inlet 102. The aft section 110 surrounds the boundary layer ingestion fan 100. The aircraft 10 further includes an inner liner 112 extending from the main section 108 of the fuselage 20 inward of the aft section 110 of the fuselage 20. Notably, for the embodiment depicted, the inner liner 112 of the aircraft 10 acts as a hub for the boundary layer ingestion fan 100. For the embodiment shown, the aft section 110 of the fuselage 20 and the inner liner 112 of the aircraft 10 together define an air flowpath 114. The air flowpath 114 extends generally from the inlet 102 defined by the fuselage 20 to the exhaust 104 defined by the fuselage 20. Additionally, the boundary layer ingestion fan 100 generally defines a centerline 116, a circumferential direction C extending about the centerline 116 (see, e.g., FIGS. 5 and 6), and includes a plurality of fan blades 120 rotatable about the centerline 116. The plurality of fan blades 120 of the boundary layer ingestion fan 100 are positioned at least partially within the air flowpath 114.

The aircraft 10 additionally includes inlet guide vanes 113 and outlet guide vanes 115 extending from the inner liner 112 to the aft section 110 of the fuselage 20 to support the inner liner 112 and guide the airflow 106 through the air flowpath 114. The inlet guide vanes 113 may remove a flow distortion from the airflow 106 before the airflow 106 reaches the fan 100 and the outlet vanes 115 may remove a swirl from the airflow 106 from the fan 100 (i.e., a fan flow). Moreover, for the embodiment depicted, the inner liner 112 forms a tail cone 117 extending through the exhaust 104.

The propulsion system of the aircraft 10 further includes a power source 118 coupled to the boundary layer ingestion fan 100 for driving the boundary layer ingestion fan 100. For the embodiment depicted, the power source 118 is an electric machine, and more specifically, an electric motor. The electric motor is coupled to a fan shaft 122, which extends to the boundary layer ingestion fan 100 for driving the boundary layer ingestion fan 100 (i.e., for rotating the plurality of fan blades 120 about the centerline 116). In such a manner, it will be appreciated that the exemplary boundary layer ingestion fan 100 depicted is an electric fan. Although not depicted, the electric motor may be in electrical communication with any suitable electric power source, such as one or more energy storage units, such as batteries, or other electric machines/electric generators. For example, at least certain exemplary embodiments, one or both of the underwing mounted gas turbine engines 42, 44 described above with reference to FIGS. 1 through 3 may be configured for driving an electric generator, which produces electrical power provided to the electric motor driving the boundary layer ingestion fan 100.

It should be appreciated, however, that in other exemplary embodiments, the power source 118 for the boundary layer ingestion fan 100 may be any other suitable power source 118. For example, in other embodiments, the power source 118 may be a combustion engine, such as a gas turbine engine, such as a turboshaft engine. Additionally, in other exemplary embodiments, the boundary layer ingestion fan 100 may have any suitable configuration. For example, in certain exemplary embodiments, the boundary layer ingestion fan 100 may include variable pitch fan blades 120, may include a gearbox or other speed change mechanism between the power source 118 and the fan blades 120, etc. Other configurations are contemplated as well.

Referring still to the exemplary embodiment depicted in FIG. 4, the vertical stabilizer 32 is coupled to, and extends from, the aft section 110 of the fuselage 20. It will be appreciated, that in other embodiments, the vertical stabilizer 32 may additionally be couple to, and extend from, the main section 108 of the fuselage 20. Further, for the embodiment depicted, the vertical stabilizer 32 defines a forwardmost point 124 where a forward edge of the vertical stabilizer 32 meets the fuselage 20. For the embodiment depicted, the boundary layer ingestion fan 100 is positioned within the fuselage 20 at a location aft of the forward-most point 124 of the vertical stabilizer 32.

Moreover, for the embodiment depicted, the air flowpath 114 defines a length 126 along the longitudinal direction L of the aircraft 10. Additionally, the boundary layer ingestion fan 100 defines a fan diameter 128. For the embodiment depicted, the length 126 of the air flowpath 114 is greater than the fan diameter 128 and up to about fifteen (15) times the fan diameter 128. More specifically, for the exemplary embodiment depicted, the length 126 of the air flowpath 114 is at least about 1.5 times the fan diameter 128, and less than about eight (8) times the fan diameter 128. It will be appreciated, however, that in other embodiments, the length 126 of the air flowpath 114 may be any other suitable multiple of the fan diameter 128.

As is also depicted, the fuselage 20 generally defines a bottom side 130 along the vertical direction V and a top side 132 along the vertical direction V. A portion of the bottom side 130 of the fuselage 20, forward of the inlet 102, and more specifically, a portion of the main section 108 of the fuselage 20 proximate the inlet 102, defines a first forward reference line 134. Further, a portion of the bottom side 130 of the fuselage 20 aft of the inlet 102, and more specifically, a portion of the aft section 110 of the fuselage 20, defines a first aft reference line 135. For the embodiment depicted, the first aft reference line 135 is substantially aligned with the first forward reference line 134. For example, each of the first forward reference line 134 and first aft reference line 135 may define substantially the same angle with the longitudinal direction L, such as the angle 48' discussed above.

Notably, in such a manner, the aft section 110 of the fuselage 20 is generally shaped as a continuation of the main section 108 of the fuselage 20. Accordingly, for example, a forward-most point 136 of the aft section 110 of the fuselage 20 at the bottom side 130 is inward of an aft-most point 137 of the main section 108 at the bottom side 130, relative to the centerline 116 of the boundary layer ingestion fan 100.

Referring still to the embodiment depicted in FIG. 4, a portion of the top side 132 of the fuselage 20 forward of the inlet 102, and more specifically, a portion of the main section 108 of the fuselage 20 proximate the inlet 102 defines a second forward reference line 138, and a portion of the top side 132 of the fuselage 20 aft of the inlet 102, and more specifically, a portion of the aft section 110 of the fuselage 20, defines a second aft reference line 140. For the embodiment depicted, the second aft reference line 140 is substantially aligned with the second forward reference line 138.

It will be appreciated, that as used herein, the term "substantially aligned with," with reference to two reference lines, refers to such reference lines defining an angle therebetween less than about 10 degrees, and a minimum spacing between the two reference lines (at a location between the two components defining such reference lines) being less than about 10 percent of a spacing between such components. Accordingly, for example, the term "substantially aligned with" with reference to the first forward and first aft reference lines 134, 135 refers to such reference lines 134, 135 defining a minimum angle therebetween less than about 10 degrees, and a minimum spacing between the two reference lines 134, 135 (at a location between the main section 108 and aft section 110 of the fuselage 20) being less than about 10 percent of a spacing between the main section 108 and aft section 110 of the fuselage 20 along the longitudinal direction L.

It will be appreciated that the fuselage 20 is designed such that the boundary layer ingestion fan 100 may be positioned therein without affecting a maximum takeoff angle (see angle 48 of FIG. 1) of the aircraft 10. Additionally, the fuselage 20 is designed such that the inlet 102 may ingest the relatively low momentum boundary layer airflow over the fuselage 20, such that the net propulsive benefit added by the boundary layer ingestion fan 100 is increased, and such that a more uniformly low momentum airflow is ingested.

Figure 5:
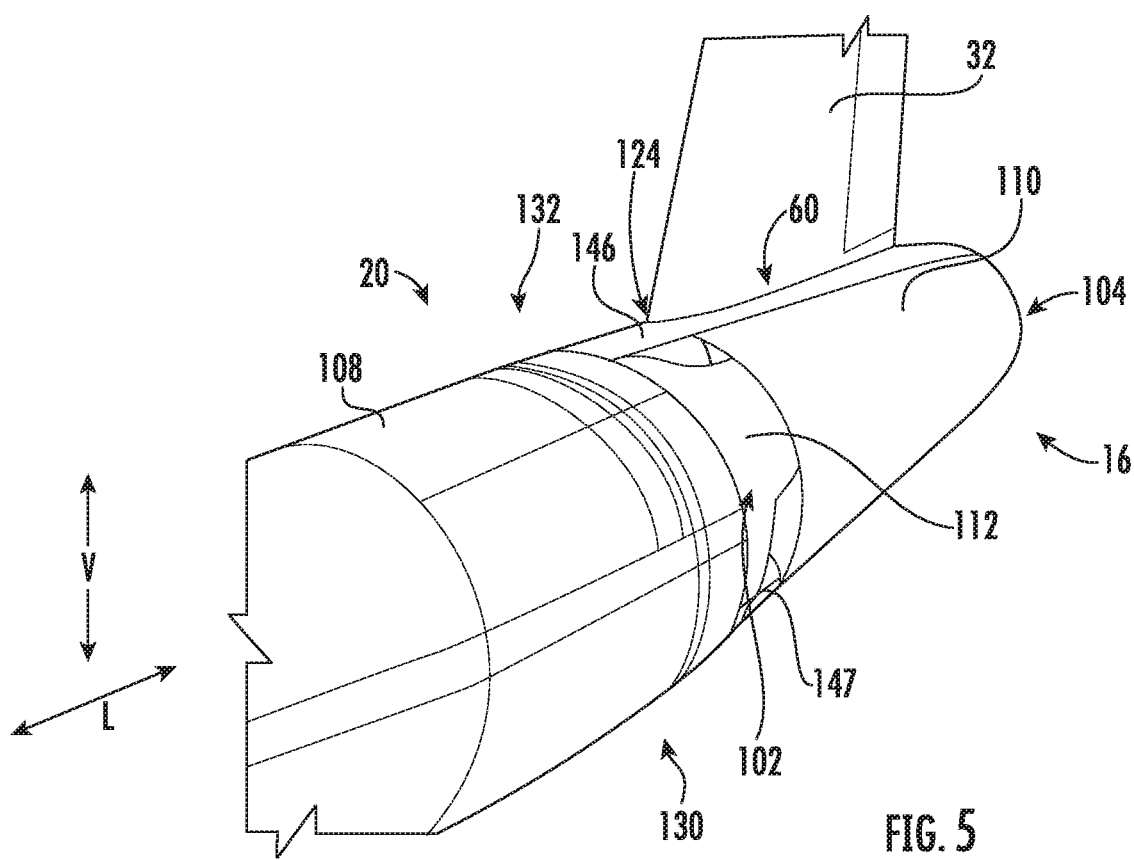
FIG. 5 is a close-up, perspective view of the aft end of the exemplary aircraft of FIG. 1.
Figure 6:
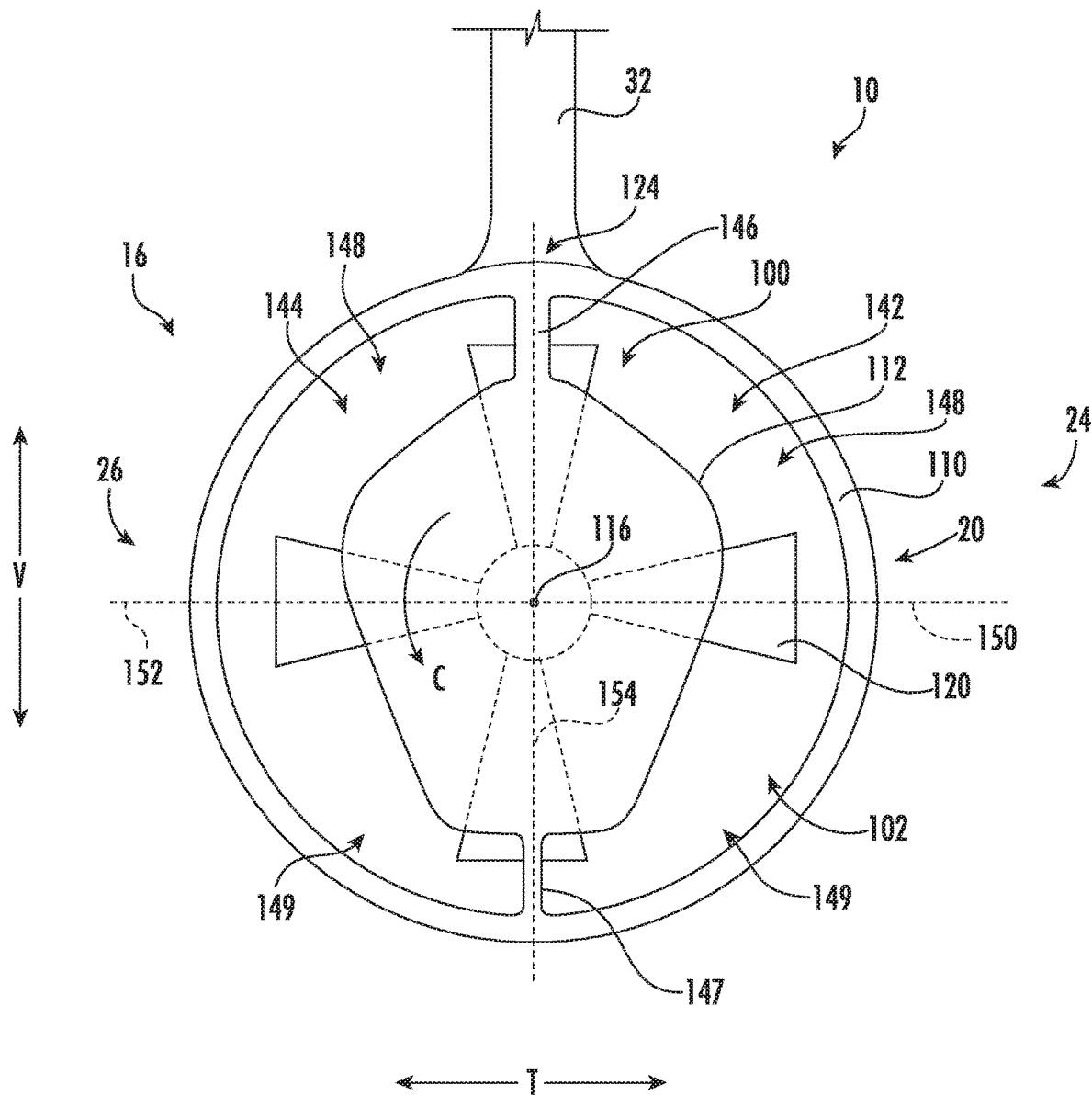
FIG. 6 is a cross-sectional view of the aft end of the exemplary aircraft of FIG. 1, taken a long Line 6-6 of FIG. 4.

Referring specifically now also to FIGS. 5 and 6, it will be appreciated that the inlet 102 defined by the fuselage 20 upstream of the boundary layer ingestion fan 100 extends cumulatively at least about 180 degrees around the centerline 116 of the boundary layer ingestion fan 100. FIG. 5 provides a close-up, perspective view of the aft end 16 of the aircraft 10, and FIG. 6 provides a close-up, cross-sectional view of the inlet 102 of the fuselage 20 along Line 6-6 in FIG. 4.

As is shown, for the exemplary embodiment depicted, the inlet 102 defined by the fuselage 20 includes a first portion 142 on the starboard side 26 of the aircraft 10 and a second portion 144 on the port side 24 of the aircraft 10. The first and second portions 142, 144 of the inlet 102, for the embodiment depicted, are separated by a top connection member 146 and a bottom connection member 147. The top connection member 146 and bottom connection member 147 each structurally connect the main section 108 of the fuselage 20 to the aft section 110 of the fuselage 20, and further, for the embodiment depicted, structurally connect the inner liner 112 of the aircraft 10 to such components.

As may be seen most clearly in FIG. 6, it will be appreciated that the first portion 142 of the inlet 102 extends substantially continuously for at least about ninety (90) degrees around the centerline 116 of the boundary layer ingestion fan 100, and further that the second portion 144 of the inlet 102 also extends substantially continuously for at least about ninety (90) degrees around the centerline 116 of the boundary layer ingestion fan 100. More specifically, for the embodiment depicted, the first and second portions 142, 144 of the inlet 102 each extend substantially continuously for at least about one hundred and twenty (120) degrees around the centerline 116 of the boundary layer ingestion fan 100, such as at least about one hundred and fifty (150) degrees around the centerline 116 of the boundary layer ingestion fan 100, such as at least about one hundred and sixty (160) degrees around the centerline 116 of the boundary layer ingestion fan 100.

Moreover, for the exemplary embodiment depicted, the first portion 142 of the inlet 102 defines a nonuniform shape along the circumferential direction C, and further, the second portion 144 of the inlet 102 also defines a nonuniform shape along the circumferential direction C. More specifically, the first portion 142 of the inlet 102 defines an upper half 148 along the vertical direction V and a lower half 149 along the vertical direction V. The upper half 148 and lower half 149 are separated by a first halfway point reference line 150 extending from the centerline 116 of the boundary layer ingestion fan 100 at a halfway mark of the first portion 142 of the inlet 102 based on a total degree span in the circumferential direction C about the centerline 116 of the boundary layer ingestion fan 100. Similarly, the second portion 144 of the inlet 102 also defines an upper half 148 along the vertical direction V and a lower half 149 along the vertical direction V, the upper and lower halves 148, 149 of the second portion 144 of the inlet 102 separated by a second halfway point reference line 152 (similarly positioned at a halfway mark of the second portion 144 based on a total degree span of the second portion 144 of the inlet 102). For the embodiment depicted, the lower half 149 of the first portion 142 of the inlet 102 defines a lower half inlet area, the upper half 148 of the first portion 142 of the inlet 102 defines an upper half inlet area. The lower half inlet area of the first portion 142 of the inlet 102 is greater than the upper half inlet area of the first portion 142 of the inlet 102. Notably, the upper and lower half inlet areas are defined in a plane perpendicular to the centerline 116 of the boundary layer ingestion fan 100 at the inlet 102 (i.e., the plane shown in FIG. 6).

Moreover, the aircraft 10 defines a reference plane 154 extending along the vertical direction V and along the centerline 116 of the boundary layer ingestion fan 100 (i.e., the view depicted in FIG. 4). The first portion 142 of the inlet 102 and the second portion 144 of the inlet 102 are, for the embodiment depicted, symmetrical about the reference plane 154. Accordingly, it will be appreciated that the lower half 149 of the second portion 144 of the inlet 102 also defines a lower half inlet area (equal to the lower half inlet area of the first portion 142 of the inlet 102), as well as an upper half inlet area (equal to the upper half inlet area of the first portion 142 of the inlet 102). For the embodiment depicted, the lower half inlet area of the second portion 144 of the inlet 102 is greater than the upper half inlet area of the second portion 144 of the inlet 102.

It will be appreciated that inclusion of a greater inlet area proximate the bottom side 130 of the fuselage 20 may allow for the ingestion of more relatively low momentum airflow over the fuselage 20, which may increase an efficiency of the boundary layer ingestion fan 100, as well as a longevity of the boundary layer ingestion fan 100.

Figure 7:
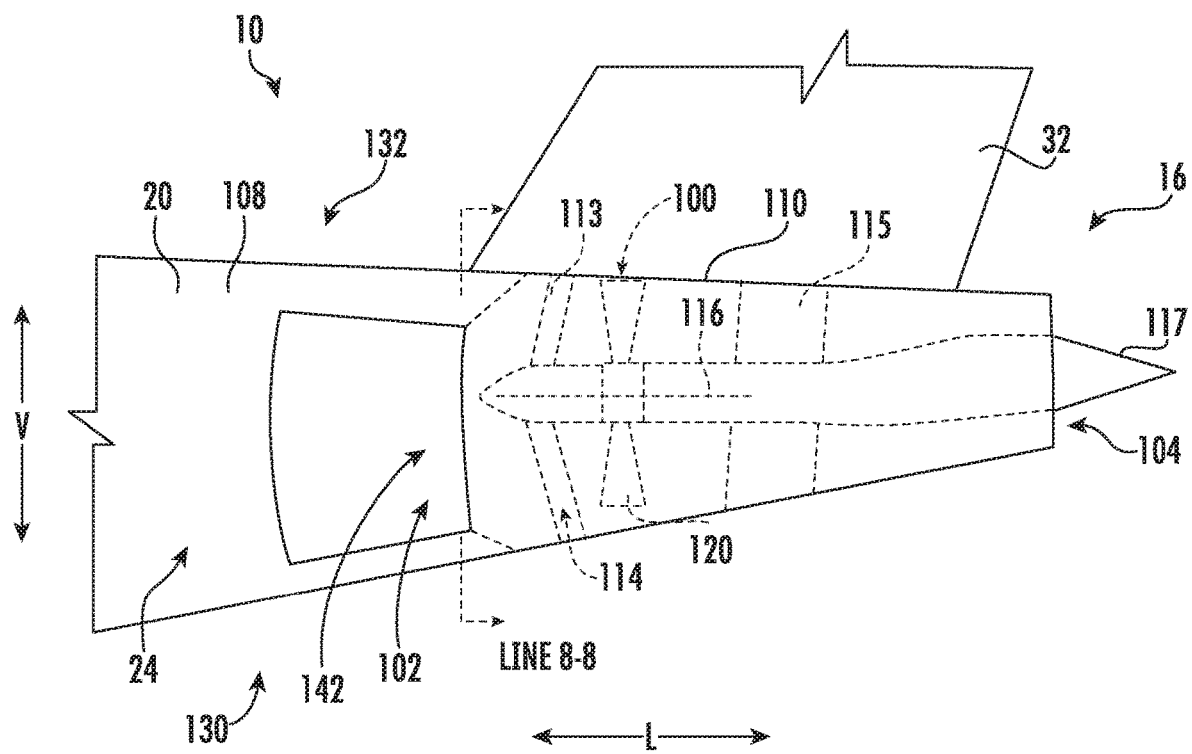
FIG. 7 is a close-up, cross-sectional view of an aft end of an aircraft in accordance with another exemplary embodiment of the present disclosure.
Figure 8:
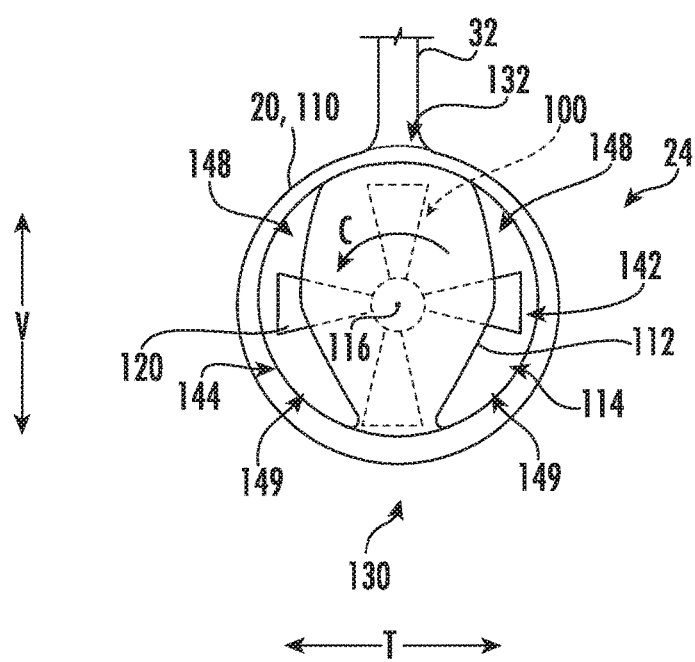
FIG. 8 is a cross-sectional view of the aft end of the exemplary aircraft of FIG. 7, taken along Line 8-8 of FIG. 7.

Notably, however, in other embodiments the fuselage 20 may have any other suitable configuration. For example, referring now to FIGS. 7 and 8, a side view and cross-sectional view of a fuselage 20 including a boundary layer ingestion fan 100 positioned therein in accordance with another exemplary embodiment of the present disclosure is provided. More particularly, FIG. 7 provides a side, close-up view of an aft end 16 of the aircraft 10, and FIG. 8 provides a cross-sectional view of the fuselage 20, taken along Line 8-8 in FIG. 7. The exemplary fuselage 20 and boundary layer ingestion fan 100 may be configured in substantially the same manner as exemplary fuselage 20 boundary layer ingestion fan 100 described above with reference to FIGS. 1 through 6.

For example, the exemplary fuselage 20 generally defines an inlet 102 and an exhaust 104, as well as an air flowpath 114 extending therebetween. The boundary layer ingestion fan 100 generally includes a plurality of fan blades 120 position at least partially within this air flowpath 114 and rotatable about a centerline 116.

Further, the inlet 102 generally includes a first portion 142 on a port side 24 of the aircraft 10 and a second portion 144 on a starboard side 26 of the aircraft 10. The first portion 142 of the inlet 102 extends continuously for at least about ninety (90) degrees around the centerline 116 of the boundary layer ingestion fan 100, and the second portion 144 of the inlet 102 also extends substantially continuously for at least about ninety (90) degrees from the centerline 116 of the boundary layer ingestion fan 100. Moreover, the first and second portions 142, 144 each define nonuniform shapes along the circumferential direction C and include a lower half 149 having a greater inlet area than an upper half 148 (see description above with reference to FIG. 6 for the definition of upper half 148 and lower half 149).

Notably, however, for the embodiment of FIGS. 7 and 8, the inlet 102 cumulatively extends substantially less than 360 degrees around the centerline 116 of the boundary layer ingestion fan 100. For example, for the embodiment depicted, the inlet 102 cumulatively extends less than about three hundred and forty (340) degrees, such as less than about three hundred and ten (310) degrees, such as less than about two hundred and eighty (280) degrees around the centerline 116 of the boundary layer ingestion fan 100. Additionally, for the exemplary embodiment of FIGS. 7 and 8, the fuselage 20 does not define a substantially circular cross-sectional shape at the inlet 102 (unlike the embodiment of, e.g., FIG. 6, above), and instead defines a bottom half having a larger cross-sectional area than a top half. This bell-mouth shape of the fuselage 20 may further allow for increased ingestion of relatively low momentum boundary layer airflow over a bottom side 130 of the fuselage 20.

Figure 9:
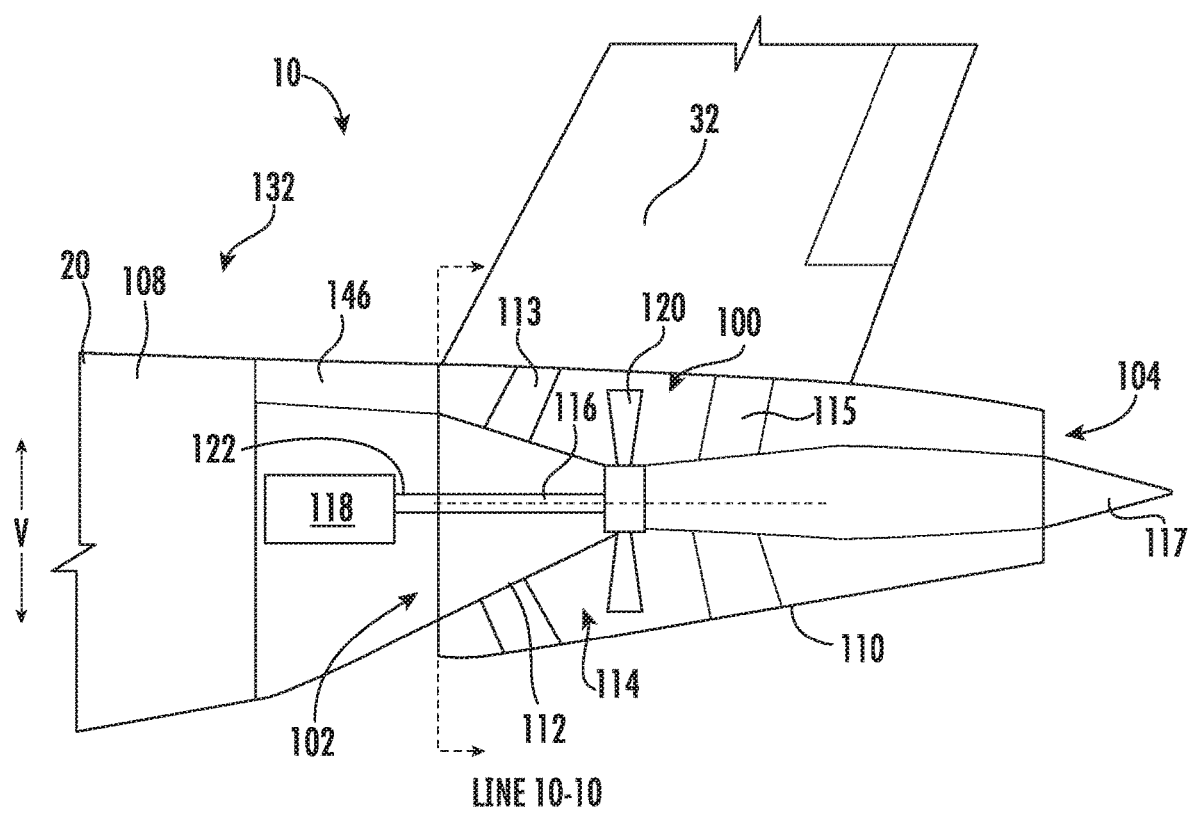
FIG. 9 is a close-up, cross-sectional view of an aft end of an aircraft in accordance with yet another exemplary embodiment of the present disclosure.

Further, it will be appreciated that in still other embodiments, the inlet 102 defined by the fuselage 20 may have any other suitable shape. For example, referring now to FIGS. 9 and 10, a fuselage 20 having a boundary layer ingestion fan 100 positioned therein in accordance with another exemplary embodiment of the present disclosure is provided. FIG. 9 provides a close-up, side, cross-sectional view of an aft end 16 of the aircraft 10 with the boundary layer ingestion fan 100 positioned therein; and FIG. 10 provides a cross-sectional view of an inlet 102 defined by fuselage 20 along Line 10-10 of FIG. 9.

Figure 10:
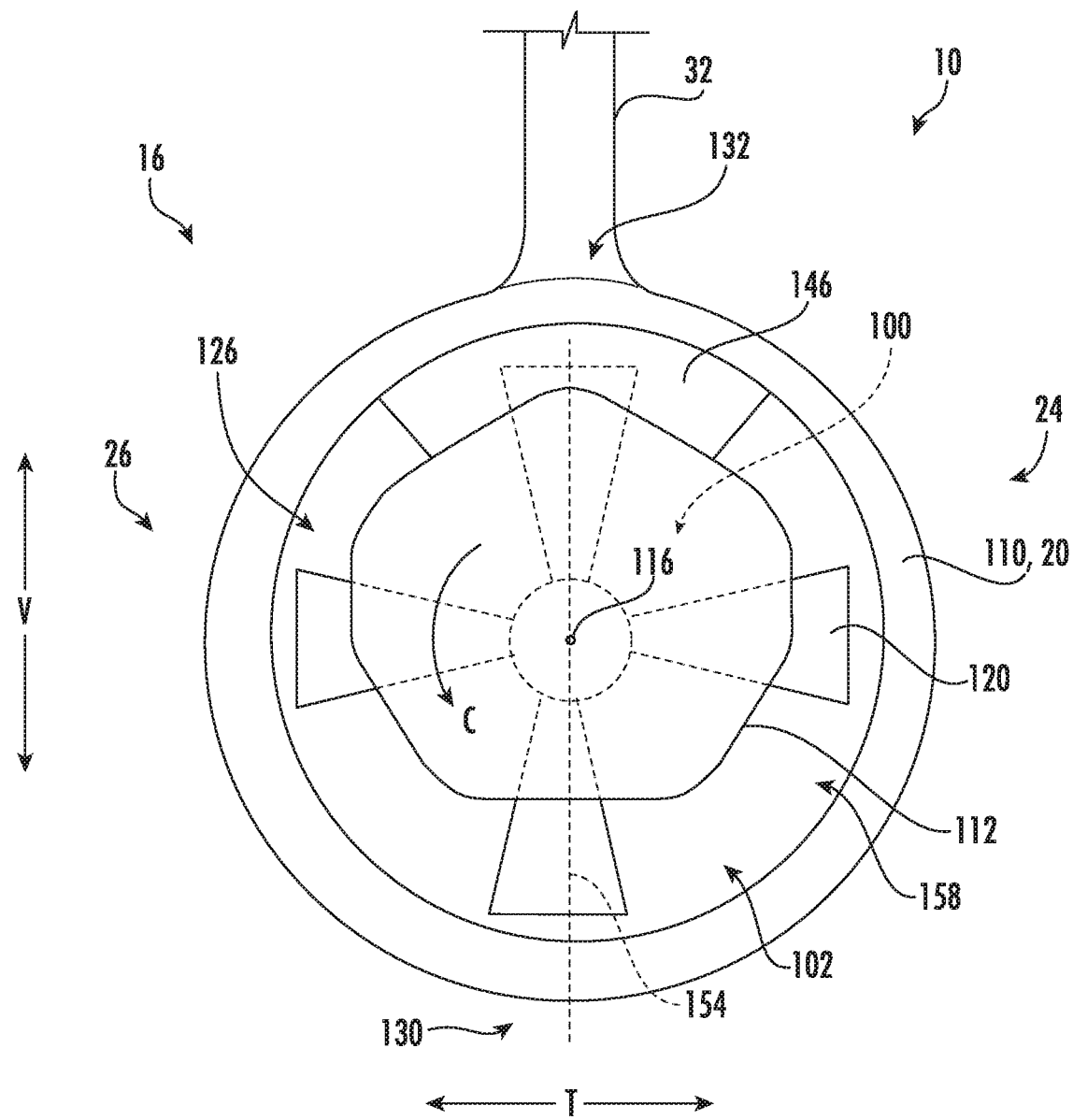
FIG. 10 is a cross-sectional view of the aft end of the exemplary aircraft of FIG. 9, taken along Line 10-10 of FIG. 9.

The aircraft 10 and the fuselage 20 of FIGS. 9 and 10 may be configured in a similar manner to the exemplary aircraft 10 and fuselage 20 described above with reference to FIGS.

1 through 6. For example, the exemplary fuselage 20 generally defines an inlet 102 and an exhaust 104, with an air flowpath 114 defined therebetween. Additionally, the boundary layer ingestion fan 100 generally includes a plurality of fan blades 120 positioned within the air flowpath 114 and rotatable about a centerline 116 of the boundary layer ingestion fan 100.

However, for the embodiment of FIGS. 9 and 10, an aft section 110 of the fuselage 20 is connected to a main section 108 of the fuselage 20 substantially completely by a top connection member 146. Such may allow for a more continuous inlet 102 around a bottom side 130 of the fuselage 20. More specifically, referring particularly to FIG. 10, it will be appreciated that the inlet 102 is defined at least partially at the bottom side 130 of the fuselage 20 and that the inlet 102 extends substantially continuously for at least about ninety (90) degrees around the centerline 116 of the boundary layer ingestion fan 100 across the bottom side 130 of the fuselage 20. More specifically, for the embodiment depicted, the inlet 102 extends substantially continuously for at least about one hundred eighty (180) degrees around the centerline 116 of the boundary layer ingestion fan 100 across the bottom side 130 of the fuselage 20. In such a manner, it will be appreciated that the inlet 102 includes a substantially continuous bottom section extending around at least the bottom ninety (90) degrees of the centerline 116 of the boundary layer ingestion fan 100, and more specifically, extending around at least the bottom one hundred and eighty (180) degrees of the centerline 116 of the boundary layer ingestion fan 100. Further, as with the embodiments described above, the aircraft 10 defines a reference plane 154 extending along the vertical direction V and along the centerline 116 of boundary layer ingestion fan 100, and the inlet 102 includes a starboard section 156 and a port section 158. For the embodiment shown, the starboard section 156 and the port section 158 of the inlet 102 are symmetrical about the reference plane 154.

Figure 11:
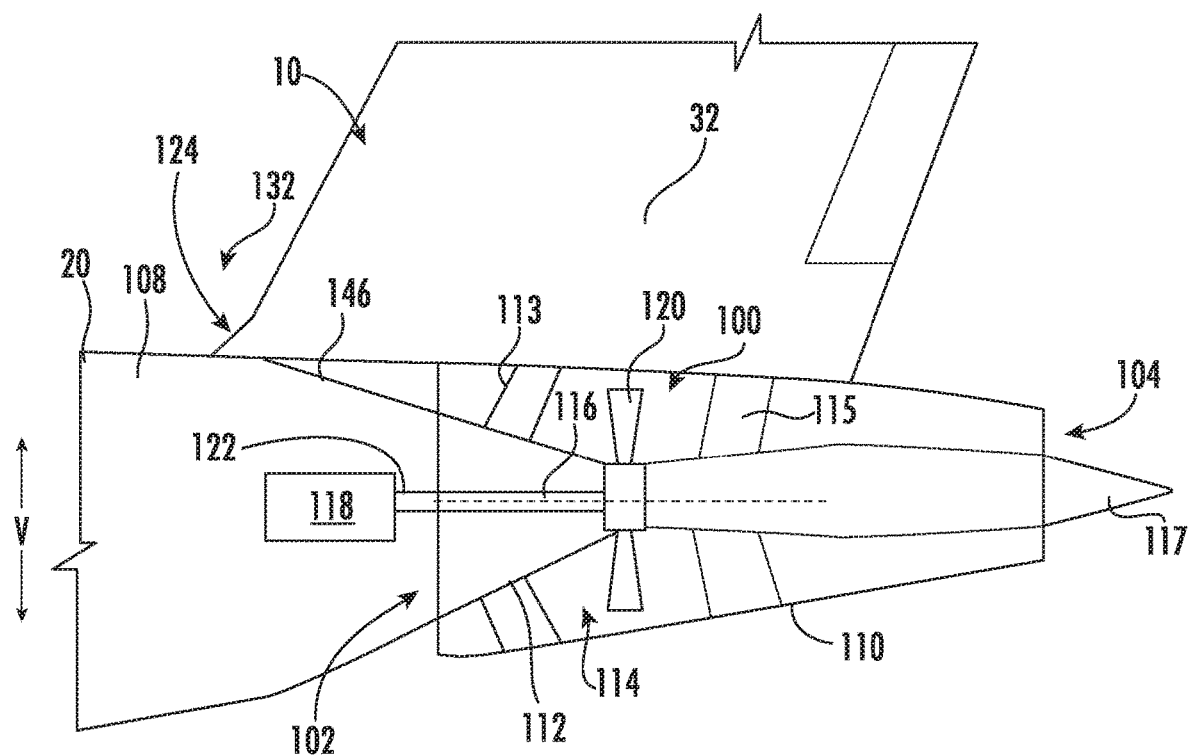

Further, still, it will be appreciated that in still other embodiments, the inlet 102 defined by the fuselage 20 may have any other suitable shape. For example, referring now to FIG. 11, a fuselage 20 having a boundary layer ingestion fan 100 positioned therein in accordance with another exemplary embodiment of the present disclosure is provided. FIG. 11 provides a close-up, side, cross-sectional view of an aft end 16 of the aircraft 10 with the boundary layer ingestion fan 100 positioned therein. The aircraft 10 and the fuselage 20 of FIG. 11 may be configured in a similar manner to the exemplary aircraft 10 and fuselage 20 described above with reference to FIGS. 9 and 10. For example, the exemplary fuselage 20 generally defines an inlet 102 and an exhaust 104, with an air flowpath 114 defined therebetween. Additionally, the boundary layer ingestion fan 100 generally includes a plurality of fan blades 120 positioned within the air flowpath 114 and rotatable about a centerline 116 of the boundary layer ingestion fan 100. Moreover, the fuselage includes an aft section 110 and a main section 108.

However, for the embodiment depicted, the aft section 110 of the fuselage 20 is connected to the main section 108 of the fuselage 20 substantially completely by a stabilizer of the aircraft 10, and more specifically by a vertical stabilizer 32 of the aircraft 10. Such may, similar to the embodiment of FIGS. 9 and 10, allow for a more continuous inlet 102 around a bottom side 130 of the fuselage 20.

It will be appreciated that inclusion of an aircraft having a fuselage defining an inlet upstream of a boundary layer ingestion fan in accordance with one or more the exemplary embodiments described herein may allow for inclusion of the boundary layer ingestion fan without negatively affecting a takeoff angle of the aircraft. Further, inclusion of a fuselage in accordance with one or more exemplary embodiments described herein may ensure that an inlet defined by the fuselage is capable of capturing desired amount of relatively low momentum airflow over a bottom side of the fuselage.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An aircraft defining a longitudinal direction and a vertical direction, the aircraft comprising:
   a boundary layer ingestion fan defining a centerline and comprising a plurality of fan blades rotatable about the centerline; and
   a fuselage extending between a forward end and an aft end along the longitudinal direction, the boundary layer ingestion fan positioned within the fuselage at the aft end of the fuselage, the fuselage defining an inlet upstream of the boundary layer ingestion fan extending at least 180 degrees around the centerline of the boundary layer ingestion fan, the fuselage further defining an exhaust downstream of the boundary layer ingestion fan,
   wherein the aircraft defines a starboard side and a port side, and wherein the inlet includes a first portion on the starboard side and a second portion on the port side, and
   wherein the boundary layer ingestion fan defines a circumferential direction extending about the centerline, and wherein the first portion of the inlet defines a nonuniform shape along the circumferential direction, and wherein the second portion of the inlet also defines a nonuniform shape along the circumferential direction.

2. The aircraft of claim 1, further comprising a power source for the boundary layer ingestion fan upstream of the inlet.

3. The aircraft of claim 2, wherein the power source is an electric machine or a combustion engine.

4. The aircraft of claim 1, wherein the first portion of the inlet defines an upper half along the vertical direction and a lower half along the vertical direction, wherein the lower half of the first portion of the inlet defines a lower half inlet area, wherein the upper half of the first portion of the inlet defines a upper half inlet area, and wherein the lower half inlet area is greater than the upper half inlet area.

5. The aircraft of claim 2, wherein the aircraft defines a reference plane extending along the vertical direction and the centerline of the boundary layer ingestion fan, and wherein the first portion of the inlet and the second portion of the inlet are symmetrical about the reference plane.

6. The aircraft of claim 1, wherein the first portion of the inlet extends continuously for at least 90 degrees around the centerline of the boundary layer ingestion fan, and wherein the second portion of the inlet also extends continuously for at least 90 degrees around the centerline of the boundary layer ingestion fan.

7. The aircraft of claim 1, wherein the fuselage defines a bottom side, wherein the inlet is defined at least partially at the bottom side of the fuselage, wherein the inlet extends continuously across the bottom side of the fuselage for at least 90 degrees around the centerline of the boundary layer ingestion fan.

8. The aircraft of claim 7, wherein the inlet extends continuously across the bottom side of the fuselage for at least 180 degrees around the centerline of the boundary layer ingestion fan.

9. The aircraft of claim 7, wherein the aircraft defines a reference plane extending along the vertical direction and the centerline of the boundary layer ingestion fan, wherein the inlet defines a starboard section and a port section, and wherein the starboard section and port section are symmetrical about the reference plane.

10. The aircraft of claim 1, wherein the fuselage defines an airflow path extending between the inlet and the exhaust, wherein the plurality of fan blades of the boundary layer ingestion fan are positioned at least partially within the airflow path.

11. The aircraft of claim 10, wherein the airflow path defines a length along the longitudinal direction, wherein the boundary layer ingestion fan defines a fan diameter, and wherein the length of the airflow path is greater than the fan diameter and up to 15 times the fan diameter.

12. The aircraft of claim 11, wherein the length of the airflow duct is at least 1.5 times the fan diameter.

13. The aircraft of claim 1, wherein the fuselage defines a bottom side along the vertical direction, wherein a portion of the bottom side of the fuselage forward of the inlet defines a forward reference line, wherein a portion of the bottom side of the fuselage aft of the inlet defines an aft reference line, and wherein the aft reference line is aligned with the forward reference line.

14. The aircraft of claim 1, wherein the aircraft further comprises:
   a stabilizer coupled to, and extending from, fuselage, the stabilizer defining a forward-most point, and wherein the boundary layer ingestion fan is positioned within the fuselage at a location aft of the forward-most point of the stabilizer.

15. The aircraft of claim 1, wherein the boundary layer ingestion fan is an electric fan.

16. An aircraft defining a longitudinal direction and a vertical direction, the aircraft comprising:
   a boundary layer ingestion fan defining a centerline and comprising a plurality of fan blades rotatable about the centerline; and
   a fuselage extending between a forward end and an aft end along the longitudinal direction, the boundary layer ingestion fan positioned within the fuselage at the aft end of the fuselage, the fuselage defining an inlet upstream of the boundary layer ingestion fan, an exhaust downstream of the boundary layer ingestion fan, and a bottom side along the vertical direction, wherein a portion of the bottom side of the fuselage forward of the inlet defines a forward reference line, wherein a portion of the bottom side of the fuselage aft of the inlet defines an aft reference line, and wherein the aft reference line is aligned with the forward reference line,
   wherein the aircraft defines a starboard side and a port side, and wherein the inlet includes a first portion on the starboard side and a second portion on the port side, and
   wherein the boundary layer ingestion fan defines a circumferential direction extending about the centerline, and wherein the first portion of the inlet defines a nonuniform shape along the circumferential direction, and wherein the second portion of the inlet also defines a nonuniform shape along the circumferential direction.

17. The aircraft of claim 16, wherein the inlet extends at least 180 degrees around the centerline of the boundary layer ingestion fan.

18. The aircraft of claim 16, further comprising a power source for the boundary layer ingestion fan upstream of the inlet.

19. The aircraft of claim 16, wherein the first portion of the inlet extends continuously for at least 90 degrees around the centerline of the boundary layer ingestion fan, and wherein the second portion of the inlet also extends continuously for at least 90 degrees around the centerline of the boundary layer ingestion fan.

20. The aircraft of claim 16, wherein the inlet is defined at least partially at the bottom side of the fuselage, wherein the inlet extends continuously across the bottom side of the fuselage for at least 90 degrees around the centerline of the boundary layer ingestion fan.

* * * * *